US010088938B2

(12) United States Patent
Perrin et al.

(10) Patent No.: US 10,088,938 B2
(45) Date of Patent: Oct. 2, 2018

(54) TOUCHSCREEN AND TOKEN INTERACTIONS

(71) Applicant: Lenovo (Singapore) Pte. Ltd., Singapore (SG)

(72) Inventors: Steven Richard Perrin, Raleigh, NC (US); John Weldon Nicholson, Cary, NC (US); Howard J. Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1004 days.

(21) Appl. No.: 13/847,003

(22) Filed: Mar. 19, 2013

(65) Prior Publication Data
US 2014/0285463 A1    Sep. 25, 2014

(51) Int. Cl.
*G06F 3/041*   (2006.01)
*G06F 3/044*   (2006.01)
*G06F 3/0488*  (2013.01)

(52) U.S. Cl.
CPC ............ *G06F 3/0416* (2013.01); *G06F 3/044* (2013.01); *G06F 3/04886* (2013.01); *G06F 2203/04803* (2013.01)

(58) Field of Classification Search
CPC ........ A63F 13/02; A63F 13/12; H04W 52/02; H04W 84/12; G06F 17/00; G06F 3/042; B07B 13/00

USPC ........ 463/17, 22, 37, 46, 317; 345/173–174, 345/179; 370/310, 311, 338
See application file for complete search history.

(56) References Cited

U.S. PATENT DOCUMENTS

| | | | |
|---|---|---|---|
| 2007/0062852 A1* | 3/2007 | Zachut | A63F 3/00643 209/683 |
| 2008/0158165 A1* | 7/2008 | Geaghan et al. | 345/173 |
| 2011/0169779 A1* | 7/2011 | Boer | G06F 3/0412 345/175 |
| 2012/0155349 A1* | 6/2012 | Bajic et al. | 370/311 |
| 2012/0276977 A1* | 11/2012 | Leczek et al. | 463/17 |

OTHER PUBLICATIONS

ATMEL QField 10-bit Touchscreen Sensor IC, 2008 (6 pages).

* cited by examiner

*Primary Examiner* — Lun-Yi Lao
*Assistant Examiner* — Johny Lau
(74) *Attorney, Agent, or Firm* — Brian J. Pangrle

(57) ABSTRACT

An apparatus can include a processor; a memory device that includes memory accessible by the processor; a touchscreen operatively coupled to the processor; and circuitry to decode fields received via the touchscreen, the fields being modulated according to modulation codes associated with a set of tokens positionable on the touchscreen. Various other apparatuses, systems, methods, etc., are also disclosed.

20 Claims, 11 Drawing Sheets

TOUCHSCREEN AND TOKEN INTERACTIONS

TECHNICAL FIELD

Subject matter disclosed herein generally relates to technologies and techniques for touchscreens and tokens.

BACKGROUND

A physical token may be used for physi-digital interaction, for example, by positioning the token on a touchscreen and performing a digital action responsive to sensing the physical presence of the token on the touchscreen.

SUMMARY

An apparatus can include a processor, a memory device that includes memory accessible by the processor, a touchscreen operatively coupled to the processor, and circuitry to decode fields received via the touchscreen, the fields being modulated according to modulation codes associated with a set of tokens positionable on the touchscreen. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

A touchscreen can include hardware for capacitive, resistive, acoustic, optical, embedded or one or more other "touch" technologies. As an example, a capacitive touchscreen may include circuitry for projected capacitance, surface capacitance, etc. Touch technology may include circuitry for sensing voltage, current, ultrasonic waves, capacitance change, light, images, force, etc. As an example, multi-touch may be defined as the ability for a touchscreen to recognize two or more simultaneous touch points. As to display technologies, a touchscreen may include circuitry for LED, LCD, plasma, cathode ray or one or more other display technologies.

Figure 1:
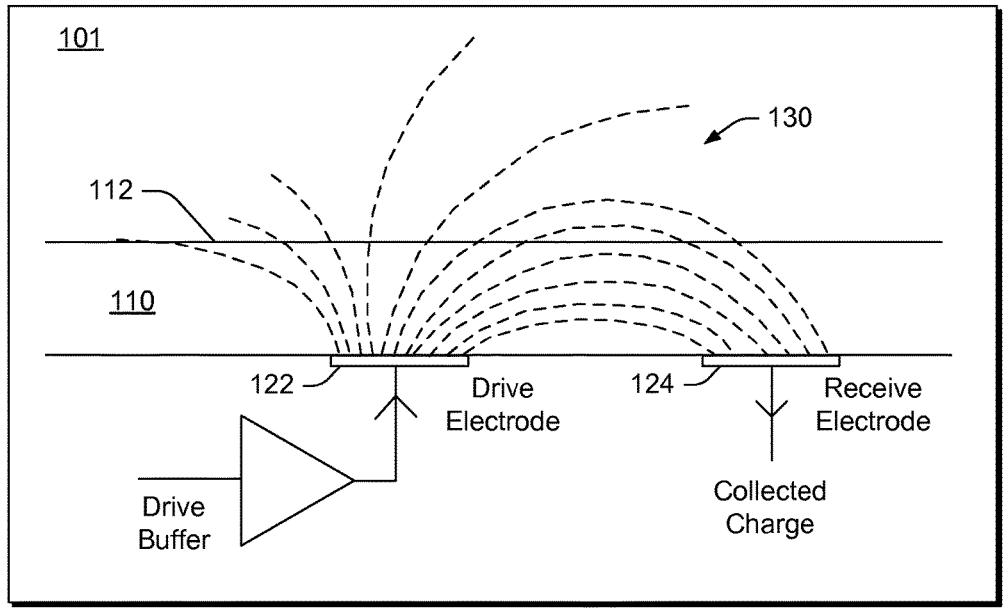
FIG. 1 is a diagram of example scenarios for an example of a touchscreen.
Figure 1:
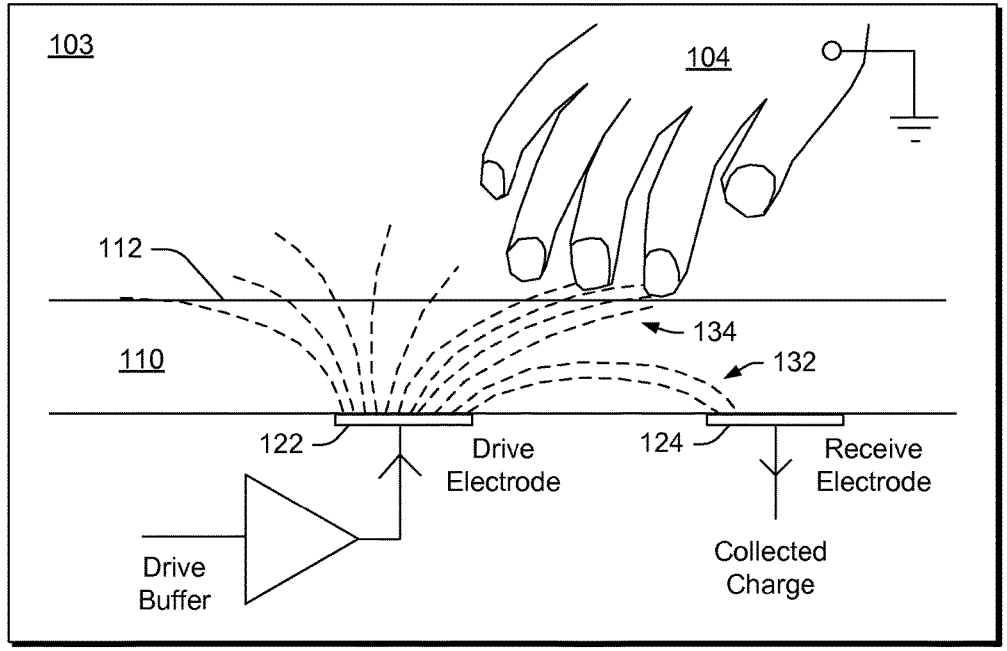

FIG. 1 shows examples of scenarios 101 and 103 with respect to a touchscreen 110. As shown in the example of FIG. 1, the touchscreen 110 includes an outwardly facing surface 112 as well as a drive electrode 122 and a receive electrode 124. In such an example, charge may be provided to the drive electrode 122 such that an electric field 130 is formed with respect to the receive electrode 124. The electric field 130 may be referred to as a "projected" electric field, for example, that corresponds to a technology known as "projected capacitance" (e.g., "p-cap").

In the example scenario 101, the projected electric field 130 may be available for "field coupling", as illustrated in the example scenario 103 by introduction of a conductive object 104 (e.g., a hand). As shown, a portion 134 of the projected electric field 130 couples with the conductive object 104, which leaves a remaining portion 132 of the projected electric field 130 coupling with the receive electrode 124. In such an example, the field coupling with the conductive object 104 acts to reduce charge collected by the receive electrode 124. In turn, the collected charge may be used as an indicator of the conductive object 104 being at or near a particular surface location on the touchscreen 110 (e.g., a particular x,y location in an x,y-plane).

As to techniques for measuring collected charge, as an example, an integrator may be implemented that integrates collected charge with respect to time. In such an example, the drive electrode may be driven using time pulses (e.g., regular approximately square wave pulses). Such a technique may act to help discriminate touches from noise, etc.

As an example, a change in collected charge may be deemed a change in capacitance, for example, as a conductive object may introduce parasitic capacitance to circuitry of a touchscreen.

Figure 2:
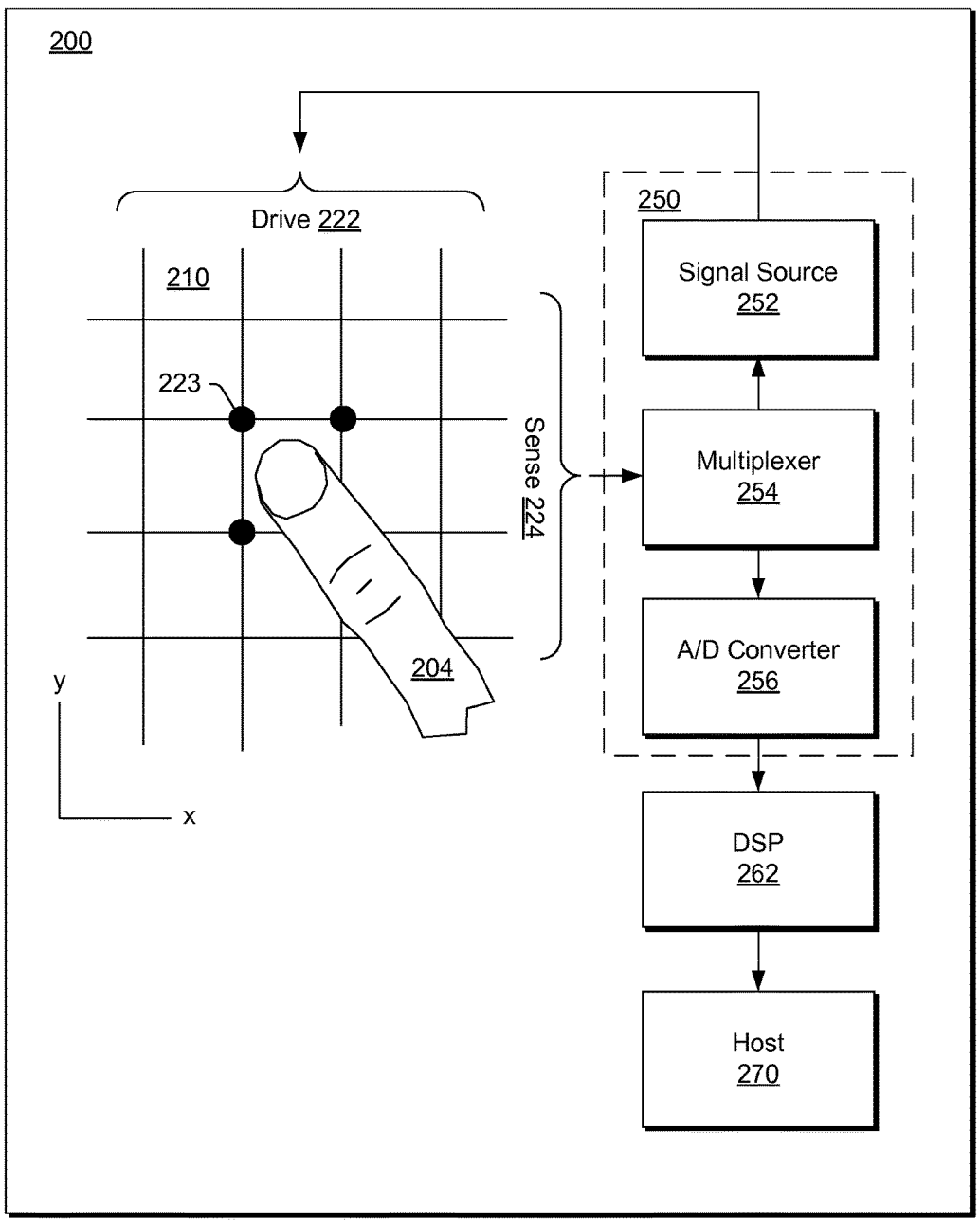
FIG. 2 is a diagram of an example of a system.

FIG. 2 shows an example of a system 200 that includes a touchscreen 210, touch controller circuitry 250 as well as a digital signal processor 262 and a host 270, for example, a host computing device that may respond to input via the touchscreen 210.

In the example of FIG. 2, the touchscreen 210 is configured using projected capacitive touch technology, for example, where a conductive layer may be etched to form an x-y grid that can be driven by, for example, drive lines 222 running along the y direction and where sensing may occur along sense lines 224 running along the x direction.

In the example of FIG. 2, the touchscreen 210 includes mutual capacitive sensors (e.g., a capacitor at each intersection of each row and each column). As mentioned, charge (e.g., voltage) may be applied to the drive lines 222 such that bringing a conductive object 204 near one or more of the capacitive sensor changes the projected electric field in a localized manner that reduces mutual capacitance. For example, the capacitance change at individual points on a grid may be measured to determine a touch location (e.g., or touch locations) by measuring voltage (e.g., collected charge).

A mutual capacitance method may include providing drive electrodes and receive electrodes organized as a matrix (e.g., an array) and measuring capacitive coupling at points in the matrix, which, in turn, in the presence of a touch or touches, may act to locate the touch or touches with respect to the matrix.

In the example of FIG. 2, the touch controller circuitry 250 includes a signal source 252 operatively coupled to the drive lines 222, a multiplexer 254 operatively coupled to the sense lines 224 and an analog-to-digital converter (ADC) 256, for example, to convert sensed analog signals of the sense lines 224 received via the multiplexer 254 to digital signals. As shown in the example of FIG. 2, the digital signal processor (DSP) 262 may receive digital signals from the touch controller circuitry 250 and provide output based at least in part on digital signal processing to the host 270. As an example, the DSP 262 may receive an output array from the touch controller circuitry 250 where values in the array represent capacitance at, for example, x-y intersections of a mutual capacitance grid of the touchscreen 210. As an example, the DSP 262 may be included in the touch controller circuitry 250.

Figure 3:
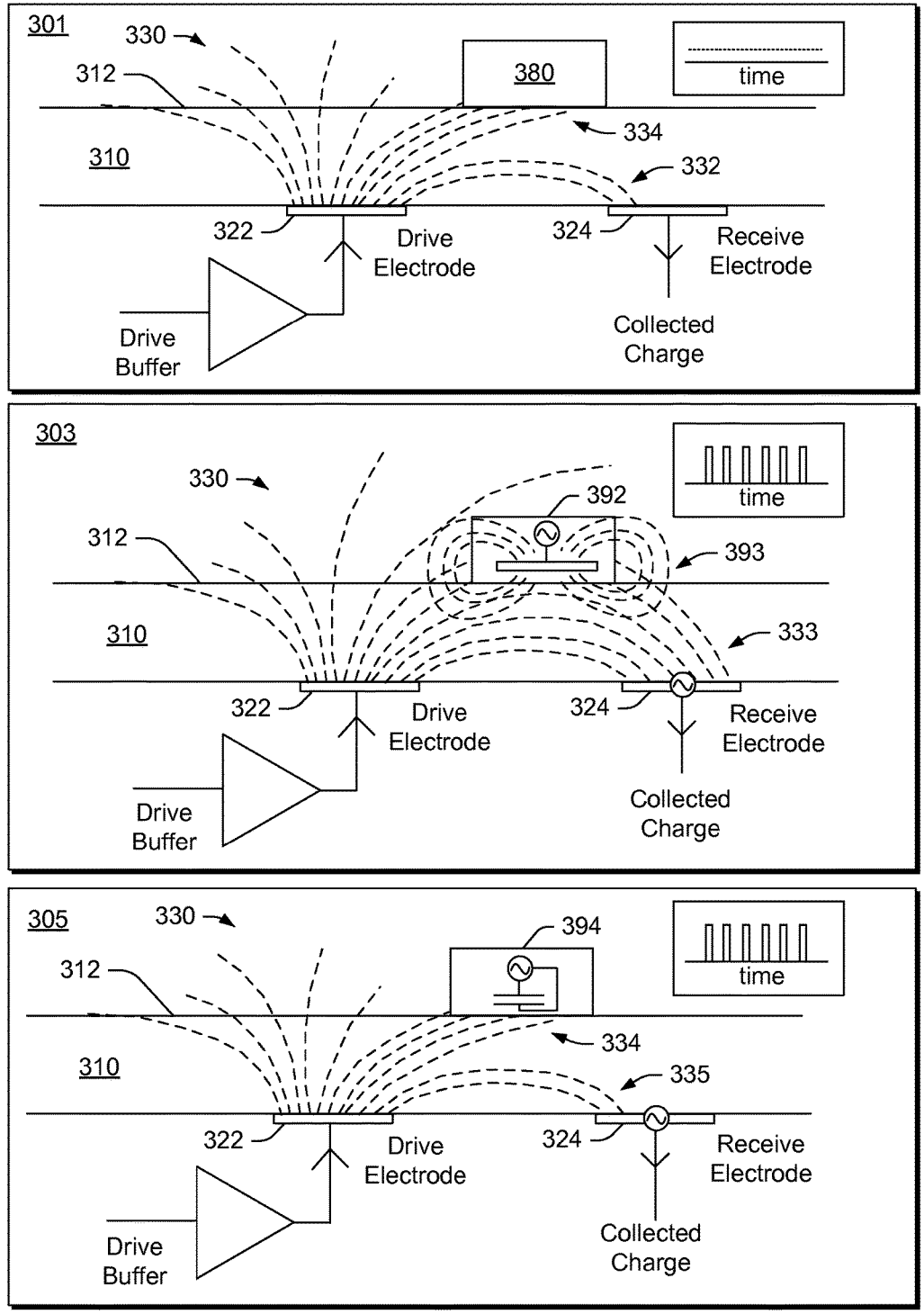
FIG. 3 is a diagram of example scenarios for touchscreen and token interactions.

FIG. 3 shows example scenarios 301, 303 and 305 with respect to example objects 380, 392 and 394, respectively (e.g., for touchscreen and token interactions). In FIG. 3, the scenarios 301, 303 and 305 are shown with respect to a touchscreen 310 that includes an outwardly facing surface 312, a drive electrode 322 and a receive electrode 324 where an electric field 330 exists between the drive electrode 322 and the receive electrode 324, for example, responsive to charge (e.g., voltage) being provided to the drive electrode 322 and the receive electrode 324 being at ground (e.g., grounded, at a ground potential, or other regulated or known potential, etc.).

In the scenario 301, the object 380 is a conductive object that attracts a portion 334 of the electric field 330 while a remaining portion 332 couples to the receive electrode 324. As indicated in a time plot for the scenario 301, characteristics of the object 380 do not vary with respect to time. Accordingly, in the scenario 301, the collected charge at the receive electrode 324 will remain constant, for example, as integrated with respect to a time over one or more successive time windows. For example, where the drive electrode 322 receives regular pulses, presence of the object 380 will diminish the collected charge at the receive electrode 324, which will remain at a constant value over a series of the regular pulses (e.g., consider integration of collected charger over a series of about 10 pulses).

In the scenario 303, the object 392 may be active in that it includes one or more characteristics that vary with respect to time in a manner that can affect the electric field 330, particularly, to effect charge collected at the receive electrode 324. As shown in a time plot for the scenario 303, the object 392 may emit an electric field 393 that varies with respect to time (e.g., pulses or other variation). Accordingly, when the time-varying electric field 393 of the object 392 is brought into proximity to the electric field 330, an altered electric field 333 exists at the receive electrode 324. In such a manner, collected charge at the receive electrode 324 can vary in time. As an example, the time-varying nature (e.g., characteristic or characteristics) of the collected charge may be related back to the object 392, for example, for purposes of identifying the object 392. For example, in the scenario 303, the touchscreen 310, via appropriate circuitry, may locate the object 392 (e.g., in x,y coordinates) and identify the object 392 (e.g., by one or more characteristics of time-varying collected charge).

In the scenario 305, the object 394 may be active in that it includes one or more characteristics that vary with respect to time in a manner that can affect the electric field 330, particularly, to alter charge collected at the receive electrode 324. As shown in a time plot for the scenario 305, the object 394 may alter its capacitance with respect to time (e.g., pulse-wise or other variation in time). Accordingly, when the object 394 is brought into proximity to the electric field 330, its parasitic capacitance as represented by a portion 334 of the electric field 330 will vary with respect to time and thereby alter a portion 335 of the electric field 330 received at the receive electrode 324. In such a manner, collected charge at the receive electrode 324 can vary in time. As an example, the time-varying nature (e.g., characteristic or characteristics) of the collected charge may be related back to the object 394, for example, for purposes of identifying the object 394. For example, in the scenario 305, the touchscreen 310, via appropriate circuitry, may locate the object 394 (e.g., in x,y coordinates) and identify the object 394 (e.g., by one or more characteristics of time-varying collected charge).

As an example, an active token may modulate an electric charge. For example, a charge may be generated on a conductive plate within a token. In such an example, modulated charge can create a time-varying electric field, which in turn affects charge on capacitors in a touchscreen (e.g., p-cap touchscreen).

As an example, an active token for a p-cap touchscreen may be configured to cause a known time-varying pattern in sensed capacitance, for example, by varying its capacitance, which may be added to a circuit as parasitic capacitance. Such an active token may be multi-state (e.g., and can switch states according to a code). As an example, modulation circuitry for such a token may include one or more varactors/varicaps, digitally tuned capacitors, etc.

While the example scenarios 303 and 305 describe a touchscreen that operates with respect to capacitance, other types of touchscreen technologies may be used, for example, where a token can vary one or more characteristics with respect to time (e.g., consider a token that can vary infrared sensing by an infrared touchscreen array, whether via transmission, reflection, etc. to affect an infrared field or fields).

Figure 4:
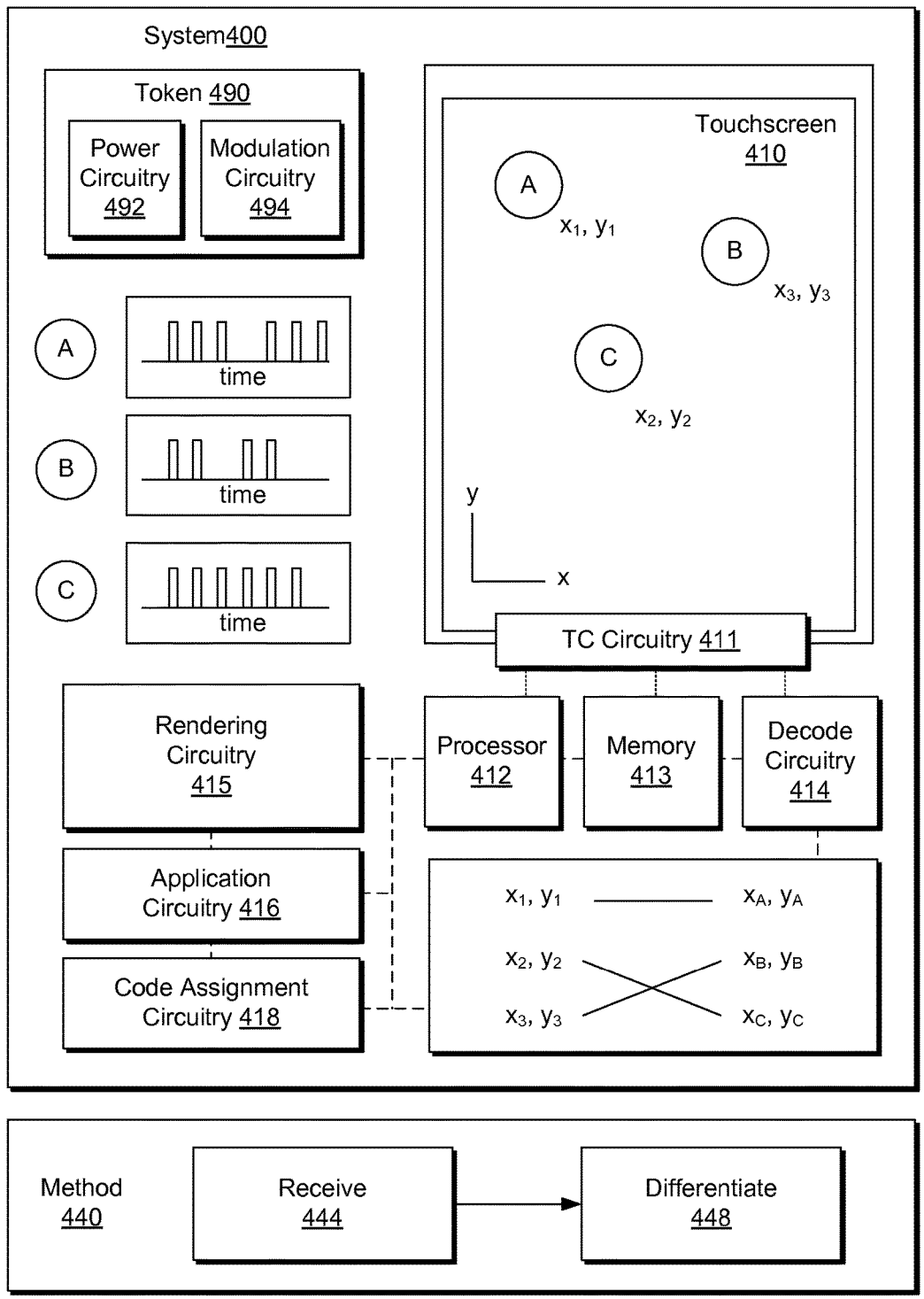
FIG. 4 is a diagram of an example of a system and an example of a method.

FIG. 4 shows an example of a system 400 that includes a touchscreen 410 with touch controller (TC) circuitry 411, a processor 412, a memory device 413 that includes memory, decode circuitry 414, rendering circuitry 415, application circuitry 416 and code assignment circuitry 418. In such an example, information output by the touch controller circuitry 411 may be received by one or more of the processor 412, the memory device 413 and the decode circuitry 414 for further processing (e.g., via a suitable connector, port, bus, etc.). As an example, the decode circuitry 414 may optionally be part of the touch controller circuitry 411 (e.g., consider a touchscreen that includes touch controller circuitry as well as decode circuitry).

As to the touchscreen 410, the touch controller circuitry 411 and decode circuitry 414, may be configured for capacitive, resistive, acoustic, optical, embedded or one or more other "touch" technologies. Such technologies may include generation of and use of a field or fields, whether electric, electromagnetic, acoustic, etc.

In FIG. 4, an example of a token 490 is also shown as including power circuitry 492 and modulation circuitry 494. As shown with respect to the touchscreen 410, a plurality of the tokens 490 may be provided, for example, as token A, token B and token C where each of the tokens includes modulation circuitry for modulating a field in a time varying manner. For example, each of the tokens A, B and C may include an associated modulation code. Such a modulation code may optionally be a selectable modulation code selected from a group of modulation codes or, for example, a modulation code determined during token manufacture.

In the example of FIG. 4, given a respective different modulation code for each of the tokens A, B and C, the system 400 may identify each of the tokens A, B and C, along with a respective location. For example, where the tokens A, B and C are placed on the touchscreen 410, the touch controller circuitry 411 may detect locations of the tokens A, B and C as three locations (e.g., $x_1, y_1; x_2, y_2;$ and $x_3, y_3$) and output information for decoding, for example, by the decode circuitry 414 (e.g., and optionally the code association circuitry 418) to individually associate each of the three locations with a particular one of the tokens A, B and C (e.g., $x_A, y_A; x_B, y_B;$ and $x_C, y_C$). In such a manner, a multi-touch signal for a plurality of objects may include coded information to specifically identify each of the plurality of objects (e.g., as token A, token B and token C).

As shown in the example of FIG. 4, the application circuitry 416 may be operable in conjunction with the code assignment circuitry 418. In such a manner, an application may receive input associated with a particular token identifiable by its code where that input is assigned to one or more actions to be performed, at least in part, by the application (e.g., or an operating system, hardware, etc.). For example, a token may be an "off" token such that an identified presence of that token causes the application to shut down (e.g., optionally without regard to its location on a touchscreen). As another example, a token may be a character in a game (e.g., a role-based token) such that an application may know when that character is present as well as its location, which may, in turn, instruct the application to perform one or more actions (e.g., which may be assigned to or otherwise associated with the character, its location, etc.).

As an example, an apparatus can include a processor; a memory device that includes memory accessible by the processor; a touchscreen operatively coupled to the processor; and circuitry to decode fields received via the touchscreen, the fields being modulated according to modulation codes associated with a set of tokens positionable on the touchscreen. In such an example, circuitry to decode fields may be configured to decode fields based at least in part on receipt of information associated with one or more time-varying fields (e.g., collected charge, intensity, etc.), for example, via touch controller circuitry.

As an example, an apparatus may include the processor 412, the memory device 413, the touchscreen 410 and the decode circuitry 414. In such an example, the memory device 413 can include memory accessible by the processor 412 and the decode circuitry 414 can provide for decoding fields received via the touchscreen 410, the fields being modulated according to modulation codes associated with a set of tokens positionable on the touchscreen 410. For example, the tokens A, B and C may be a set of tokens (e.g., consider a set that includes a plurality of tokens such as the token 490) positionable on the touchscreen 410 where each includes a modulation code (e.g., as effectuated via the modulation circuitry 494 as coupled to the power circuitry 492).

Referring to the tokens 392 and 394 of FIG. 3, they may include power circuitry that provides power to modulation circuitry to vary an emitted electric field with respect to time (e.g., consider the token 392) or to vary a capacitance with respect to time (e.g., consider the token 394).

As an example, a touchscreen of an apparatus may be a capacitive touchscreen, an infrared touchscreen, or other type of touchscreen. For example, as to an infrared touchscreen, a token may include modulation circuitry for modulating an infrared field. In such an example, a token may include one or more emitters that can emit infrared radiation peripherally in a manner detectable by one or more infrared detectors of a touchscreen.

As an example, a modulation code may be orthogonal to another modulation code. For example, for a set of tokens, orthogonal modulation codes may be provided. In such an example, orthogonality of the modulation codes may facilitate identification of codes and hence particular tokens.

As an example, an apparatus may include assignment circuitry to assign one or more parameters to a modulation code. For example, consider an assignment process that includes positioning one or more tokens on a touchscreen and then assigning one or more parameters based at least in part on the touchscreen positions. As an example, assignment circuitry may instruct a processor to render a grid to a touchscreen where each block in the grid can be associated with one or more parameters. In such an example, tokens may be placed in the blocks of the grid, be located with respect to blocks of the grid, be identified via respective modulation codes and, in turn, be assigned one or more parameters. In such a manner, the modulation codes need not necessarily be assigned one or more parameters in advance (e.g., a priori).

FIG. 4 also shows an example of a method 440 that include a reception block 444 for receiving modulated fields associated with a set of tokens on a touchscreen where each of the tokens modulates a respective one of the fields; and a differentiation block 448 for differentiating at least one of the tokens from at least another one of the tokens based on their corresponding modulated fields. In such an example, differentiating may include identifying modulation codes, which may be, for example, orthogonal codes. As an example, a method may include, based in part on differentiating at least one token of a set of tokens, associating one or more parameters with that at least one token. In such an example, the method may include instructing an application according to at least one of the one or more parameters. As an example, a token may change its code responsive to, for example, time, manner of use, position, stacking, etc. In such an example, one or more parameters associated with that token may change.

Figure 5:
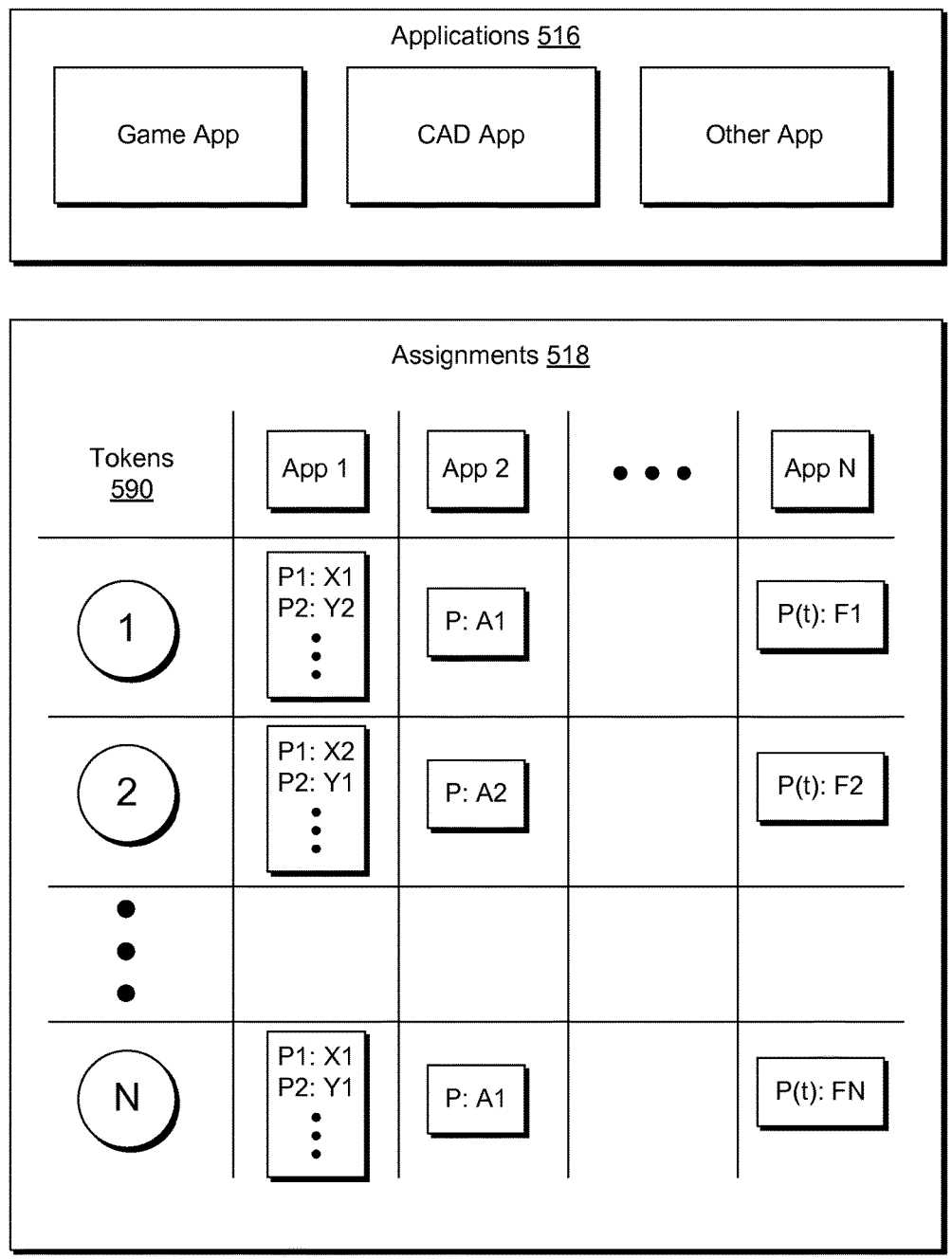
FIG. 5 is a diagram of examples of applications and examples of assignments for tokens and applications.

FIG. 5 shows example applications 516 and example assignments 518 for tokens 590 and applications such as one or more of the applications 516. As shown, an application may be a game application, a computer-aided design application or another type of application.

As to a game application, consider a game implemented by executable code that includes rendering information to a display. As an example, consider the game of roulette where tokens may be positioned on a surface to place bets, which may include inside bets and outside bets. For example, an inside bet may be a straight bet (e.g., a single number bet) where a token is positioned entirely within a number square; a split bet where a token is positioned on a line adjoining two number squares (e.g., either vertical or horizontal); a street bet where a token is positioned on the edge of the line of a number at the end of the line (e.g., either left or right, depending on layout); a corner (or square) bet on four numbers in a square layout where a token is positioned at the horizontal and vertical intersection of lines between four numbers; a six line (or double street) bet on two adjoining streets where a token is positioned at the corresponding intersection; a trio bet for a token as if in between where two street bets would be positioned; a basket bet where a token is positioned at the intersection of three desired numbers; or a top line a bet where a token is positioned either at the corner of 0 and 1, or the corner of 00 and 3.

As to outside bets, consider a manque bet; a passe bet; a rouge ou noir bet (e.g., red or black); a pair ou impair (odd or even) bet; a dozen bet; a column bet; or a snake bet.

In the roulette example, tokens that include modulation circuitry may modulate a field according to a modulation code or, for example, modulations codes. In such an example, a modulation code may be associated with a value (e.g., one dollar, five dollars, . . . one thousand dollars, etc.), a player (e.g., James S., Sarah B., etc.), a status (e.g., silver member, gold member, whale, etc.), an establishment (e.g., casino X, casino Y, etc.), etc. Where a token includes modulation circuitry configured to modulate a field using a plurality of codes, a token may be associated with one or more of the foregoing examples (e.g., or other associations). For example, consider a token that includes modulation circuitry to modulate a field according to a value code and to modulate a field according to a player code. In such an example, a game application may be able to track values of tokens being played and the players that are playing those tokens. Further, in an example such as the roulette example, the game application may track types of bets (e.g., value, player and type of bet or bets).

As to a CAD application, consider a building design application where tokens may include modulation circuitry for field modulation according to one or more modulation codes. In such an example, a modulation code may be assigned parameters for a structural feature such as a wall, a door, a window, a plumbing fixture, a heating fixture, etc. For example, consider a touchscreen and a plurality of tokens where positioning of the tokens on the touchscreen causes a CAD application to "draw" a building floor plan with walls, doors, windows, etc. by locating the positions of the tokens and identifying each of the tokens by a modulation code as belonging to a particular building feature. As another example, consider a flow charting application where a token may represent a start block, a decision block, an end block, etc. In such an example, a user may position tokens on a touchscreen and the application may locate their positions and identify each of the tokens by a modulating code belonging to a particular flow chart entity and, in response, draw a flow chart.

Referring to the assignments 518 of FIG. 5, as indicated, a token may be assigned one or more properties associated with an application. As an example, a property may optionally be itself dependent on one or more variables. For example, consider a time dependent property (e.g., a property that is a function of time). In such an example, time may correspond to time that a token is on a touchscreen, on a touchscreen at a particular location, on a touchscreen while one or more other tokens are also on the touchscreen, etc. For example, consider a game where a token represents an egg or a chicken depending on how long the token has been present on the touchscreen.

As an example, a set of tokens may be used for one or more applications. In such an example, the set of tokens may be assigned to a first game application and then later assigned to a second game application, assigned to a first CAD application and then later assigned to a second CAD application, assigned to a game application and then later assigned to a CAD application, etc.

In the example of FIG. 5, as indicated with respect to "App N", one or more properties may depend on a function or functions, which may be, for example, a function or functions with respect to time. As an example, a modulation code of a token may depend on one or more factors, for example, consider a modulation code that can change depending on a factor such as time, location, proximity or other relationship to another token (e.g., stacking, etc.), orientation (e.g., up/down), etc. As an example, such a factor or factors may define states where a code of a token may change in response to a change in state. For example, a token may use one code for "heads" and another code for "tails"

(e.g., consider a "coin" token); a token may use one code for "on" and another code for "off" (e.g., consider a "switch" token); or a token may use one of a series of codes to represent a number (e.g., "0" to "9" or other numbers, characters, etc.) (e.g., consider a "dial" token). As to the latter example, consider an incrementing or decrementing algorithm that causes a token to change its code to represent an increased number or a decreased number based on a change in state. For example, consider a state that corresponds to repositioning of a token on a touchscreen, a state that corresponds to stacking a token (e.g., whether on a touchscreen or off a touchscreen), a state that corresponds to rotating a token on a touchscreen (e.g., where the touchscreen or the token may detect rotation), etc.

Figure 6:
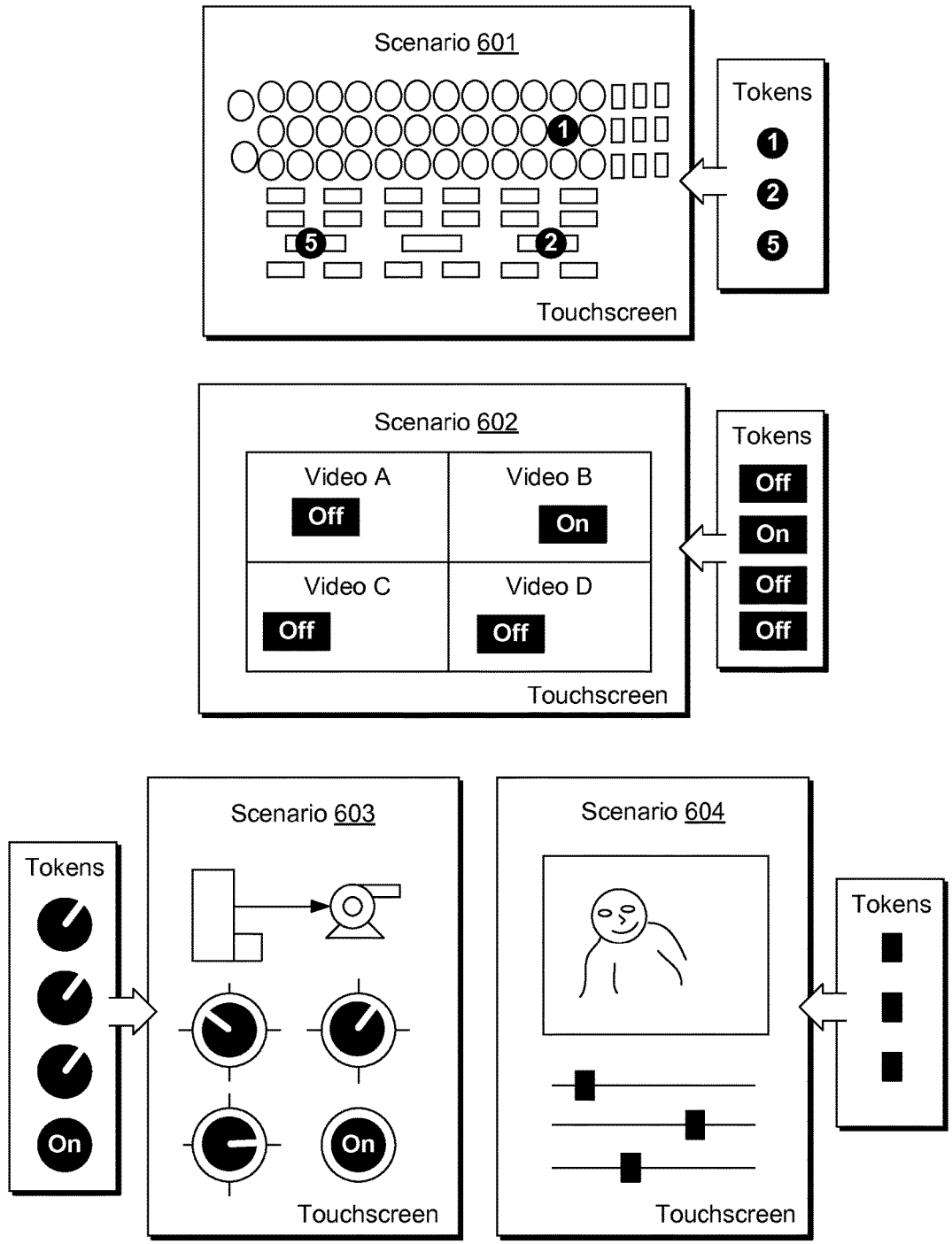
FIG. 6 is a diagram of example scenarios that include examples of tokens on a touchscreen.

FIG. 6 shows example scenarios 601, 602, 603 and 604 with respect to examples of tokens positioned on a touchscreen. Such scenarios may be considered physi-digital scenarios.

As to the scenario 601, three tokens are shown with respect to a betting table for roulette (e.g., a roulette application) where each of the tokens is labeled with a number (e.g., for purposes of explanation) to indicate a value, which may be ascertained by a code (e.g., a modulation code).

As to the scenario 602, four tokens are shown with respect to videos A, B, C and D on a touchscreen, which may correspond to security cameras, videos available for recording or viewing, etc. As shown, an "on" token or an "off" token may be positioned on the touchscreen to instruct an application (e.g., or applications) to perform or not perform one or more actions with respect to each of the videos. As an example, a "play" token, a "pause" token, a "fast forward" token, etc. may be provided, for example, to individually control one or more actions with respect to video (e.g., or audio, audio/video, etc.).

As to the scenario 603, a control process is shown on a touchscreen which may be for a plant, a simulation of a plant, etc. In the example scenario 603, indexes are rendered to the touchscreen whereby one or more tokens may be positioned and rotated, for example, to control one or more pieces of equipment of the plant. For example, a pump may be controlled, a temperature may be controlled, etc. Also shown in the example scenario 603 is an "on" token, which may be for turning on a controller, an application, a piece of equipment, etc.

As to the scenario 604, an image is shown on a touchscreen along with lines, which may be scales for parameters such as those of an RGB image (e.g., consider an image processing application). For example, three tokens may be positioned along the scales to select RGB values for the image.

As an example, one or more properties, parameters, etc., may be determined using a combination of modulation codes and physical contacts. As an example, a "dial token" may emit a constant code where the position of the dial may be determined by sensing the positions of the physical contacts relative to the coordinates of the touch surface. As an example, consider a token with asymmetric contact points (e.g., nubs, etc.) such that a touchscreen may determine an orientation of the token on a screen. As another example, consider a rectangular token that includes four nubs, one located near each corner. In such an example, a touchscreen may determine orientation of the rectangular token by sensing the four nubs.

Figure 7:
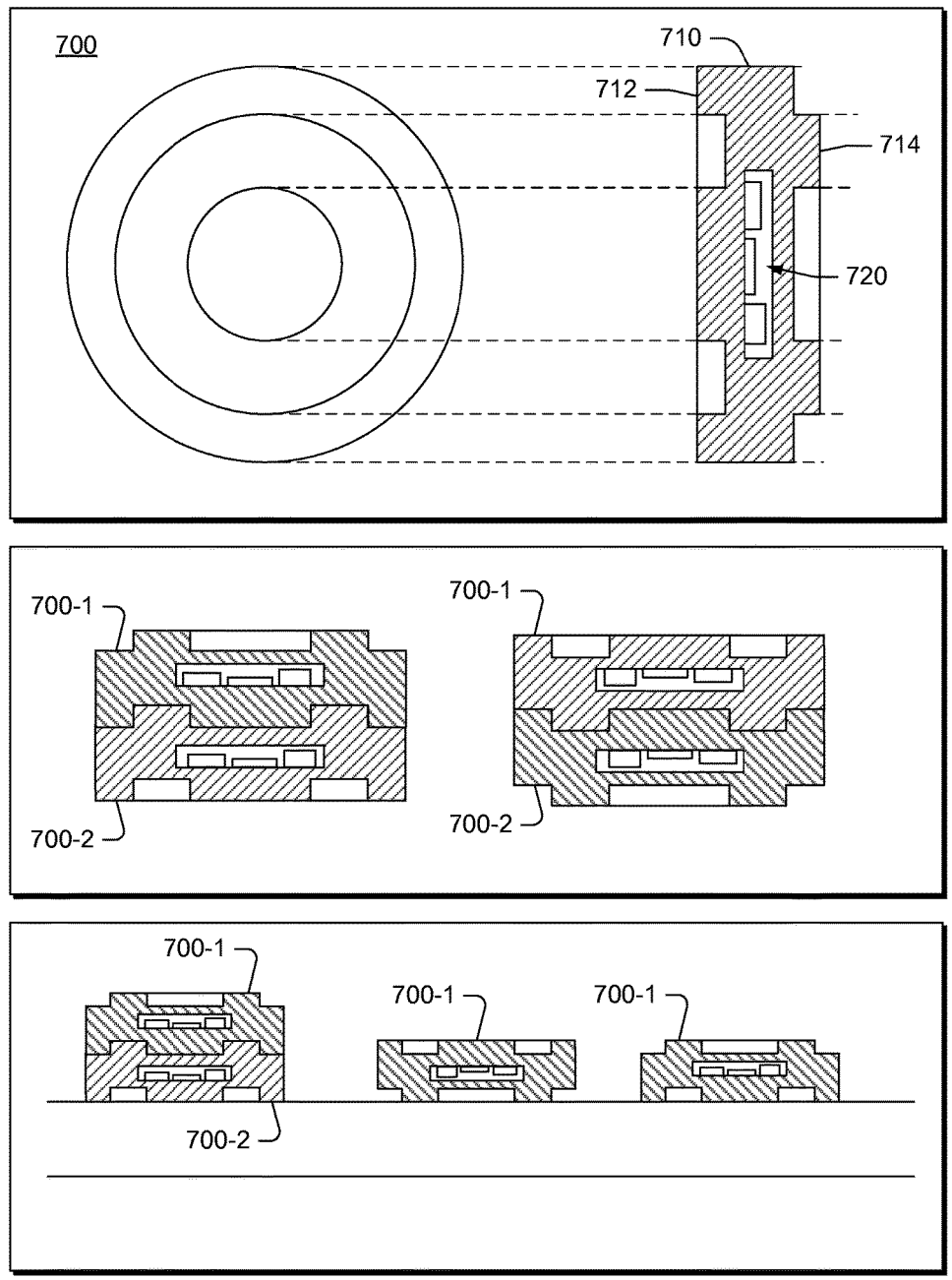
FIG. 7 is a diagram of an example of a token.

FIG. 7 shows an example of a token 700 as including a body 710 that includes a surface 712 and an opposing surface 714 as well as circuitry 720. In the example of FIG. 7, the surface 712, the surface 714 or both the surface 712 and the surface 714 may be considered a base (e.g., depending on orientation of the token with respect to an outwardly facing surface of a touchscreen). As an example, a surface of the token 700 may be constructed from a material that diminishes risk of damage to an outwardly facing surface of a touchscreen (e.g., to avoid scratches, etc.). For example, a material may be soft yet unlikely to carry (e.g., entrain) hard particles. In the example of FIG. 7, the circuitry 720 can include power circuitry and modulation circuitry and optionally other circuitry.

FIG. 7 also shows examples of stacking, for example, where two or more tokens 700-1 and 700-2 may be stacked as well as examples of orientations, for example, where the token 700 may be oriented on an outwardly facing surface of a touch screen on the surface 712 or the surface 714. As to orientation, in the example of FIG. 7, the token 700 may cause a touchscreen to sense different touches for each orientation. For example, the surface 712 may include a circle and an annular ring while the surface 714 may include an annular ring (e.g., without a circle). In such an example, a touchscreen (e.g., or associated circuitry) may be able to determine orientation, which, in turn, may be information used by an application to control an action, a behavior, etc.

As an example, the token 700 may include "feet" or "nubs" on one or both of the surfaces 712 and 714. As an example, in a set of tokens, one or more tokens may include a different number of nubs than one or more other tokens. For example, one token may include three nubs along a surface while another token may include four nubs along a surface (e.g., which may be symmetrically oriented or asymmetrically oriented). In such an example, a touchscreen may sense three touches for the former token and four touches for the latter token. Such information may be additional information for purposes of an application or applications. As an example, a token may include a single touch surface (e.g., consider the circular portion of the surface 712). In such an example, each token in a set of tokens may be sensed as being associated with a single touch position. In such an example, discrimination between individual tokens may occur based on modulation codes (e.g., per modulation circuitry).

As an example, a set of tokens may include tokens of approximately the same dimensions or of different dimensions. For example, consider a set of tokens that includes four small tokens and four larger tokens. In such an example, a touchscreen may sense different signals for the small and large tokens due to size. In such an example, discrimination between individual tokens may occur based on modulation codes (e.g., per modulation circuitry). For example, four modulation codes may be used for the small tokens and optionally the same four modulation codes may be used for the large tokens. In such an example, circuitry may identify each of the eight tokens (e.g., based in part on size and based in part on modulation code).

As to stacking, the circuitry 720 of the token 700 may include stacking circuitry that detects the presence of one or more other tokens. Such circuitry may operate via electrical contacts or other mechanism and may optionally output information to modulation circuitry of the token 700. For example, consider the stacked tokens 700-1 and 700-2 whereby stacking causes a change in operation of the modulation circuitry of the lowermost token 700-2. As an example, stacking may cause modulation code harmonization (e.g., such that tokens in a stack modulate according to the same modulation code). As an example, stacking may not alter modulation code(s) and a touchscreen may be configured to sense field modulation from more than one token in a stack. In such an example, a location for a lowermost token may be sensed along with two or more modulation codes such that circuitry may determine that stacked tokens reside at that location. Corresponding logic may be implemented, for example, as to an application to note or act upon stacking of tokens. As an example, consider the aforementioned roulette game application where stacking may be associated with value at a location, the value being determined by a sum of individual tokens of the stack.

Figure 8:
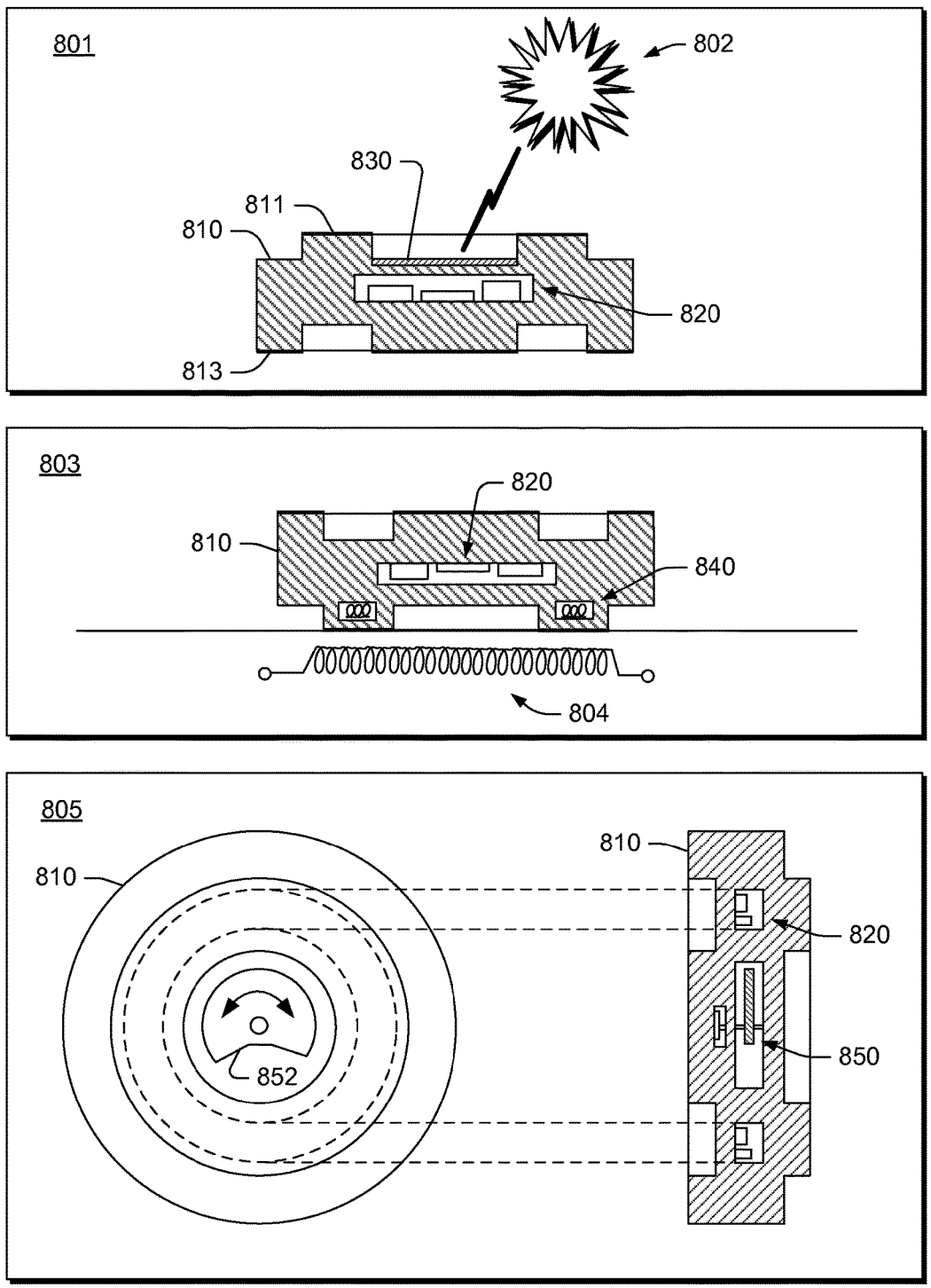
FIG. 8 is a diagram of examples of tokens.

As an example, a token may include a battery, power cell, etc., which may optionally be rechargeable, replaceable, etc. As to some examples of powering a token, FIG. 8 shows a solar powered token 801, an electromagnetically powered token 803 and a mechanically powered token 805. As to the solar powered token 801, it includes a body 810, a surface 811, a surface 813, circuitry 820 (e.g., modulation circuitry and optionally other circuitry) and solar collector circuitry 830. While the solar collector circuitry 830 is shown with respect to one side of the token 801, it may be located on another side of the token 801 or the token 801 may include solar collector circuitry at multiple locations. In such an example, light (e.g., the sun 802 or other light source) may emit radiation that can be collected by the solar collection circuitry 830 and transformed to power for powering the circuitry 820 of the token 801.

As to the electromagnetically powered token 803, it includes a body 810, circuitry 820 and a coil 840 (e.g., or coils). In such an example, an external coil 804 may emit electromagnetic energy that can be received by the coil 840. In turn, the coil 840 may charge a circuit (e.g., a capacitor, battery, etc.) of the token 803. As an example, a touchscreen may include a coil or coils such as the coil 840. In such a manner, a plurality of tokens may be powered by the touchscreen (e.g., during use of the tokens with respect to an application, etc.). As another example, a charger may include a coil or coils such as the coil 840. For example, one or more tokens may be placed on such a charger (e.g., a "wireless" charger) prior to use on a touchscreen. In such an example, the charge provided to the one or more tokens may be sufficient to power the tokens for length of an intended use (e.g., a game, a CAD session, etc.).

As to the mechanically powered token 805, it includes a body 810, circuitry 820 and a mechanical mechanism 850 that includes a mass 852. In such an example, the mass 852 may be rotatable about an axis (e.g., a shaft) in a manner whereby rotation of the mass 752 about the axis causes winding of a spring, coupling of a magnet and a coil, etc. to thereby power the circuitry 820 of the token. As an example, a set of tokens may be placed on an orbiting plate prior to use where an orbital motion of the plate causes a mechanical mechanism in each of the tokens to store power. As another example, a user may shake, swirl, etc. a token or tokens prior to use where such movement causes the token or tokens to store power.

Figure 9:
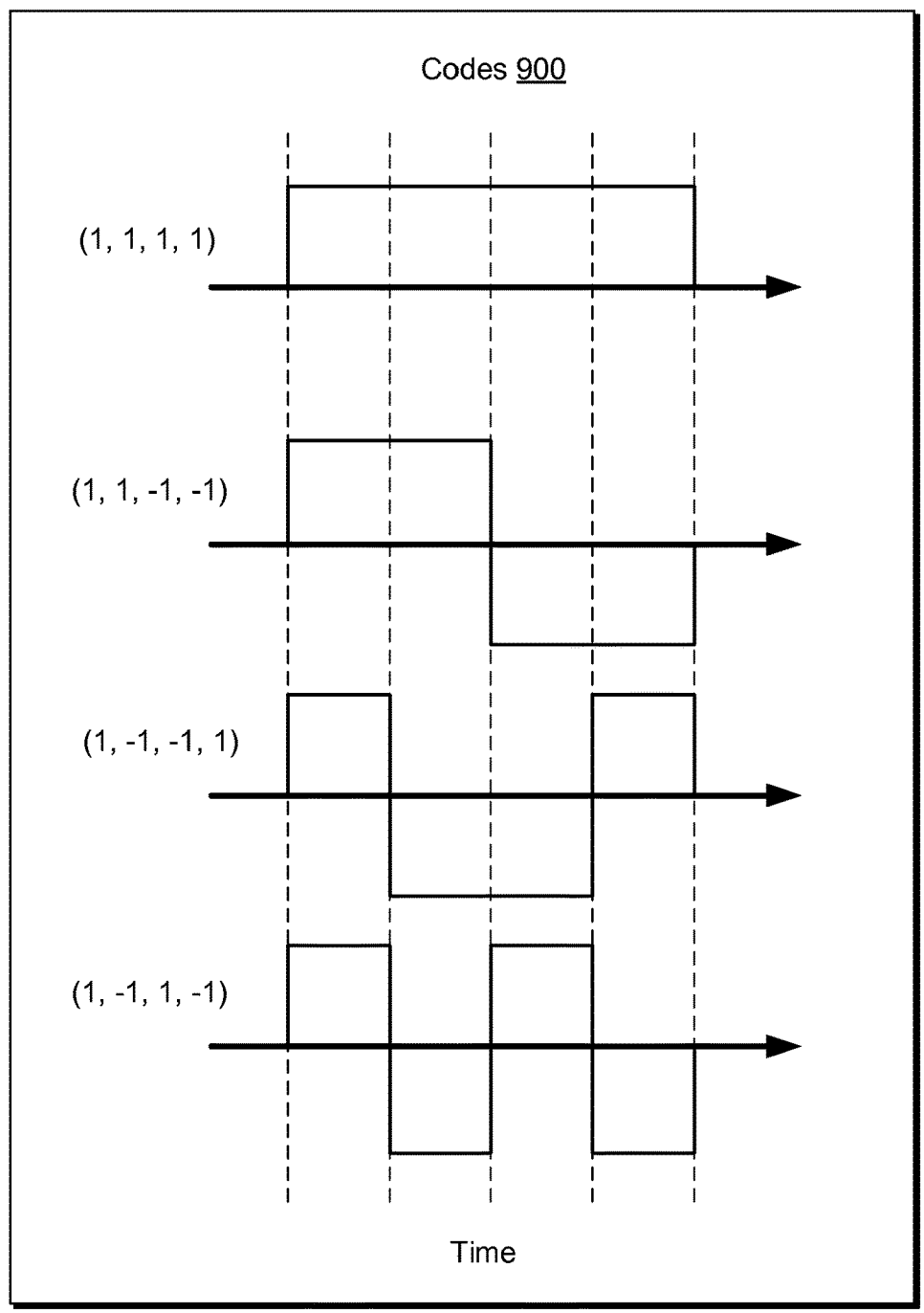
FIG. 9 is a diagram of examples of codes.

FIG. 9 shows examples of codes 900 (e.g., modulation codes). As an example, a set of tokens may implement codes according to mathematical properties of orthogonality between vectors representing data strings. For example, a binary string 1011 may be represented by a vector (1, 0, 1, 1). In such an example, vectors may be multiplied by taking their dot product, by summing the products of their respective components (e.g., for example, if u=(a, b) and v=(c, d), then their dot product u·v=ac+bd). In the foregoing example, where the dot product is zero, the two vectors are said to be orthogonal to each other.

As an example, for a set of tokens, each token may include modulation circuitry that can modulate a characteristic of the token according to a code orthogonal to codes of the other tokens. The example codes 900 include four mutually orthogonal digital signals (e.g., represented by four vectors). Such orthogonal codes are intended to have a cross-correlation equal to zero (e.g., to not interfere with each other). As an example, so-called Walsh codes may be used to encode different tokens (e.g., token types, etc.). For example, for 64 bit Walsh codes, individual Walsh codes are orthogonal to one another and signals may be channelized into 64 orthogonal signals. As an example, a token may include encoding circuitry (e.g., modulation circuitry) and a touchscreen (e.g., or system operatively coupled to the touchscreen) may include decoding circuitry.

As an example, each token in a set of tokens may be associated with a different code, for example, represented by a vector. In such an example, a set of tokens may be positioned on a touchscreen where position of the tokens may not be discernible (e.g., based on implemented capabilities of the touchscreen) or desired as an input (e.g., to an application). In such an example, a touchscreen may sense a "combined" signal for all of the tokens at the same time. As to another example, consider stacking of tokens at a positioned on a touchscreen such that the touchscreen senses a combined signal for that position. In the foregoing examples, consider two tokens where a touchscreen senses two signals that may be (a) in phase and add to give twice the amplitude of each signal or (b) out of phase and subtract to give a signal that is the difference of the amplitudes. Digitally, such behavior may be modeled by the addition of the vectors, component by component. For example, a raw signal for multiple tokens without additional position information or for stacked tokens may be called an interference pattern where a sensor (e.g., decode circuitry) may extract an intelligible signal for a known token/modulation code by combining the token's code with the interference pattern. For example, decode circuitry may include logic to deconstruct an interference pattern (e.g., or reconstruct an interference pattern) to determine what codes are within information sensed by a touchscreen.

As an example, at least a portion of a token may be conductive. For example, a portion of a token may be constructed from a conductive material (e.g., metal, alloy, conductive carbon, etc.). As an example, a token may include a non-conductive body, for example, constructed from a material such as plastic, rubber, etc.

As an example, a token can include a body that includes a base; power circuitry carried by the body; and modulation circuitry carried by the body and electronically coupled to the power circuitry to modulate a field according to a modulation code that identifies the token. In such an example, the modulation circuitry may emit an electromagnetic field at least in part in the infrared spectrum, the modulation circuitry may modulate an electric charge to thereby modulate an electric field, etc.

As an example, a token may include power circuitry that can receive energy and converts the received energy to power. As an example, power circuitry may include a battery.

As an example, a base of a token may include one or more surfaces for supporting the token on a planar surface. As an example, such a token may include an upper portion configured to seat the base for token stacking.

As an example, a set of tokens may include modulation circuitry for at least two different modulation codes. As an example, each of a plurality of tokens may include modulation circuitry for a different modulation code.

Figure 10:
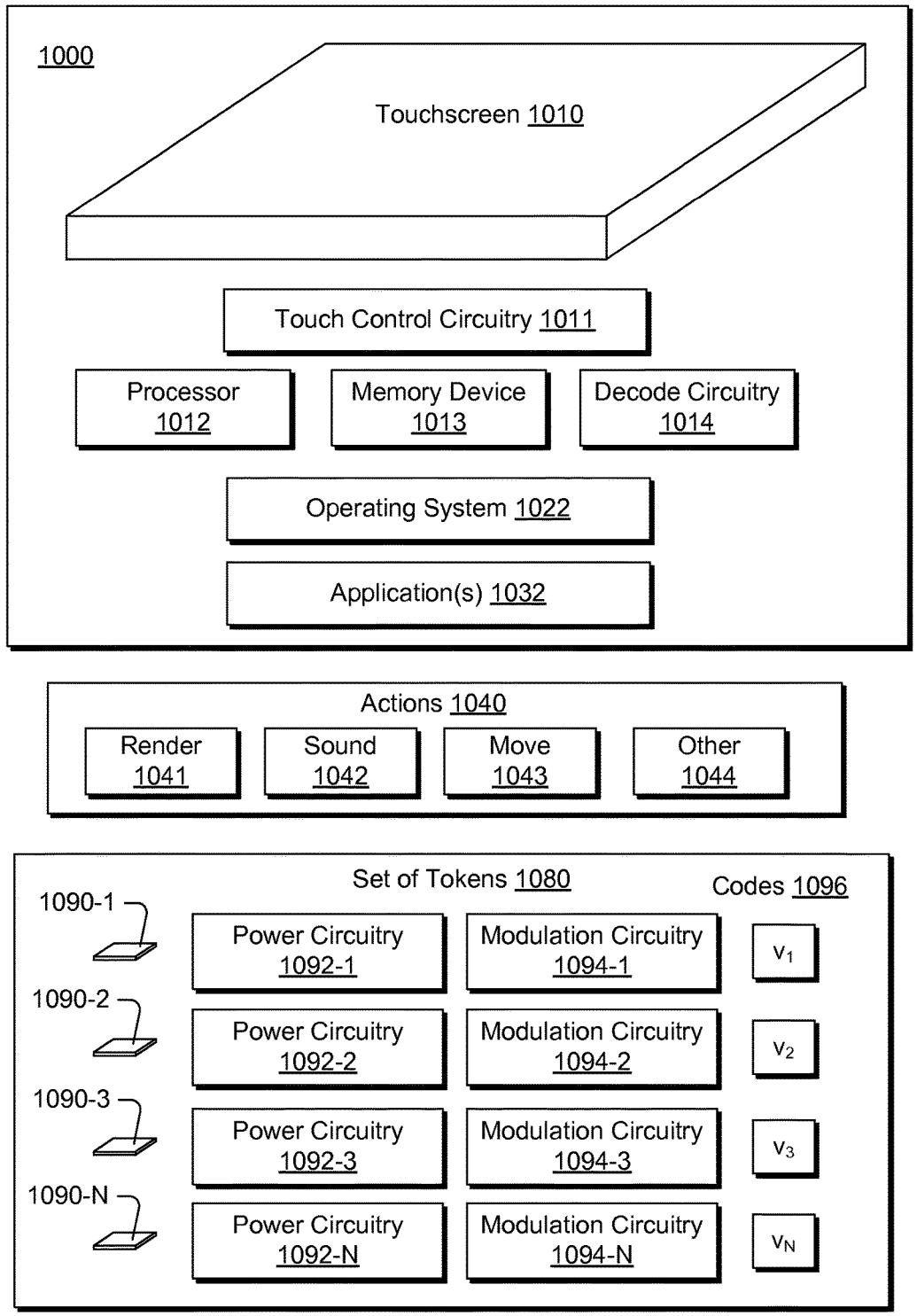
FIG. 10 is a diagram of an example of an apparatus, an example, of actions and an example of a set of tokens.

FIG. 10 shows an example of an apparatus 1000 and an example of a set of tokens 1080, along with examples of actions 1040. In the example of FIG. 10, the apparatus 1000 includes a processor 1012, a memory device 1013 that includes memory accessible by the processor 1012, a touchscreen 1010 operatively coupled to the processor 1012, and circuitry 1014 to decode fields received via the touchscreen 1010, the fields being modulated according to modulation codes associated with a set of tokens positionable on the touchscreen. For example, the set of tokens 1080 includes individual tokens 1090-1, 1090-2, 1090-3 and 1090-N, which include corresponding power circuitry 1092-1, 1092-2, 1092-3 and 1092-N and corresponding modulation circuitry 1094-1, 1094-2, 1094-3 and 1094-N, which may operate according to one or more modulation codes 996, for example, $v_1$, $v_2$, $v_3$ and $v_N$ (e.g., where "v" may represent a vector where at least some of the vectors are orthogonal). Accordingly, the circuitry 1014 of the apparatus 1000 may decode fields received via the touchscreen 1010 where the fields are modulated according to modulation codes 1096 associated with the set of tokens 1080, which are positionable on the touchscreen 1010.

In the example of FIG. 10, the apparatus 1000 may include an operating system 1022 and one or more applications 1032, for example, executable using the operating system 1022. In such an example, the apparatus 1000 may call for one or more of the actions 1040, for example, consider a render action 1041 for rendering a visualization to the touchscreen 1010, a sound action 1042 for generating a sound (e.g., via a speaker), a movement action 1043 for moving the touchscreen 1010 or other object (e.g., an environmental action), or one or more other actions 1044.

As an example, the apparatus 1000 may include features such as one or more of the features included in the LENOVO® IDEADCENTRE® A720 "all-in-one" computing device (e.g., sold by Lenovo (US) Inc. of Morrisville, N.C.). For example, the aforementioned A720 computing device includes an Intel® Core i7 processor, a 27 inch frameless multi-touch display (e.g., for HD resolution of 1920×1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner. As an example, the touchscreen (multi-touch display) may provide for approximately 10 or more point multi-touch sensing (e.g., to support 10 or more tokens, for example, depending on touches per token).

As an example, an application may execute while media is being rendered to a touchscreen, for example, consider media of a TV, cable or satellite broadcast (e.g., of a movie, a show, an instructional video, etc.). As an example, the application may receive input via one or more tokens positioned on the touchscreen and, in turn, act to control the media, overlay visual renderings, set reminders, etc.

As an example, decode circuitry may be provided in the form of a unit, for example, that may be connected to an apparatus, a device, a system, etc. or, for example, that may be provided in the form of code that may be executed on an apparatus, a device, a system, etc. As an example, consider providing decode circuitry as an "after-market" unit for use with a computing device such as the aforementioned A720 computing device. In such a manner, information sensed by touch controller circuitry may be routed to the decode circuitry to identify one or more tokens by one or more associated modulation codes. As another example, consider providing decode circuitry code as "after-market" code for implementation by a computing device such as the aforementioned A720 computing device. In such a manner, information sensed by touch controller circuitry may be analyzed by one or more algorithms of the decode circuitry code being executed on the computing device (e.g., as an application, as firmware, etc.) to identify one or more tokes by one or more associated modulation codes.

As an example, a set of tokens, a touchscreen and decode circuitry may provide for various types of physi-digital interaction. In such an example, the tokens in the set of tokens may be "active" in that they have an ability to "communicate" their state back to a controller, for example, by modulating a signal in time. In such an example, a token "possesses" a physical property that may be measured by a controller, and which can assume, for example, 2 or more states (see, e.g., the vectors of FIG. 9). As an example, a token may "transmit" information by changing states in a controlled manner. As noted, various techniques described herein may be applied to one or more technologies (e.g., including existing touch screen technologies, including infrared and projected capacitive).

As an example, for an infrared (IR) touch system, sensing circuitry may include one or more IR detectors placed along an edge of a display panel. In such an example, a token may emit infrared light, reflect infrared light, etc., in a manner modulated according to a modulation code (e.g., consider time-varying emission, reflection, etc. via a peripheral surface of a token). As an example, for a projected capacitive system, sensing circuitry may detect changes in capacitance at a given point on a display panel. In such an example, a token may modulate field according to a modulation code that alters detected capacitance, modulate capacitance according to a modulation code that thereby modulates an electric field of the projected capacitive system, etc.

As an example, tokens may implement one or more information coding techniques (e.g., consider various CDMA techniques). As an example, a token may transmit data using a pseudo-noise code sequence (e.g., consider a Walsh Hadamard sequence, a Gold sequence, etc.) which is orthogonal to the sequences used by one or more other tokens. In such an example, sensing circuitry that include decoding capabilities may isolate a signal as stemming from a particular token, for example, by performing a convolution of a received signal with the code signal for the particular token. As an example, a touchscreen may sense information from tokens that may include stacked tokens (e.g., two or more tokens stack on top of one another).

As an example, a device may include a hypervisor, for example, executable to manage one or more operating systems. With respect to a hypervisor, a hypervisor may be or include features of the XEN® hypervisor (XEN-SOURCE, LLC, LTD, Palo Alto, Calif.). In a XEN® system, the XEN® hypervisor is typically the lowest and most privileged layer. Above this layer one or more guest operating systems can be supported, which the hypervisor schedules across the one or more physical CPUs. In XEN® terminology, the first "guest" operating system is referred to as "domain 0" (dom0). In a conventional XEN® system, the dom0 OS is booted automatically when the hypervisor boots and given special management privileges and direct access to all physical hardware by default. With respect to operating systems, a WINDOWS® OS, a LINUX® OS, an APPLE® OS, or other OS may be used by a computing platform.

As described herein, various acts, steps, etc., can be implemented as instructions stored in one or more computer-readable storage media. For example, one or more computer-readable storage media can include computer-executable (e.g., processor-executable) instructions to instruct a device.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 11:
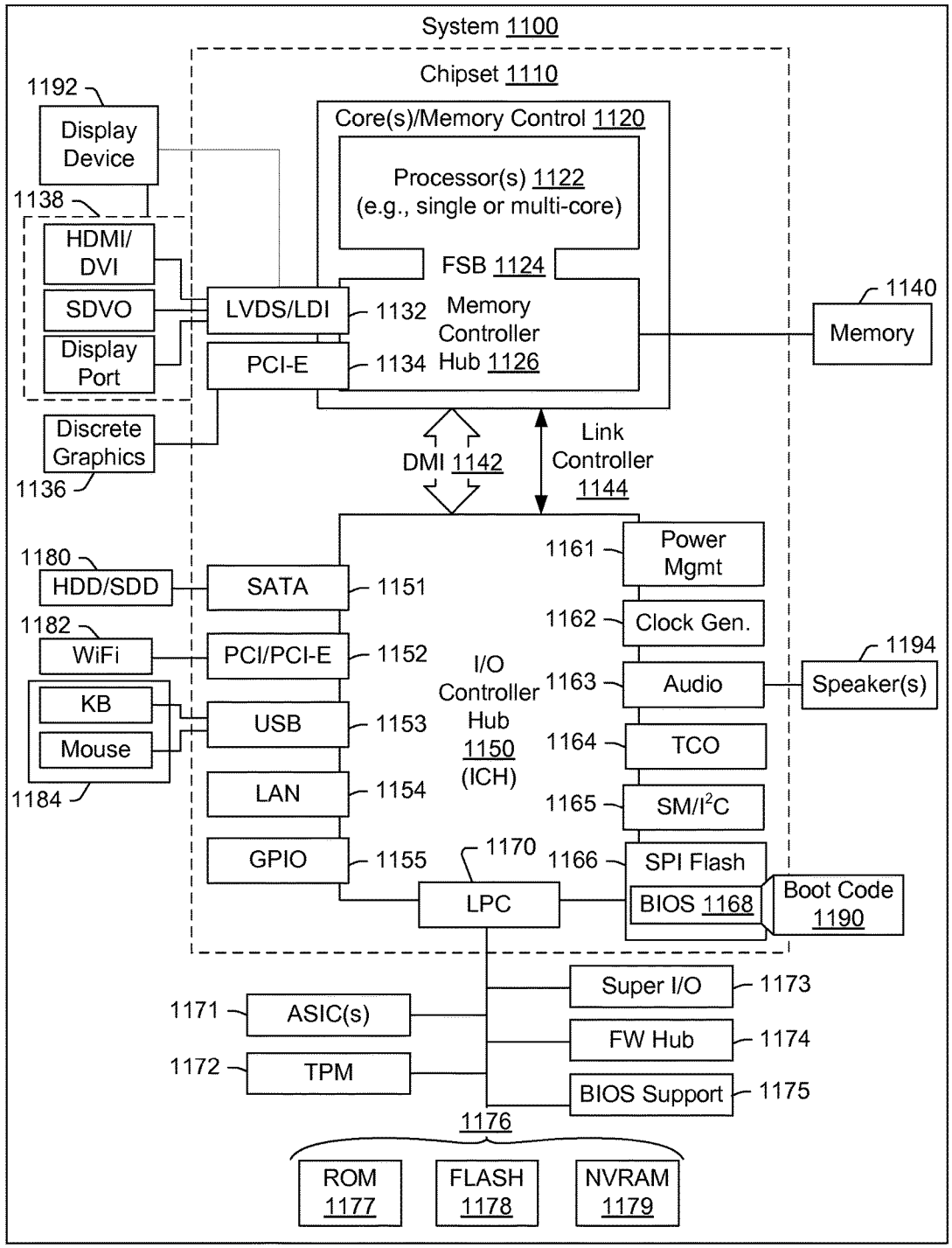
FIG. 11 is a diagram of an example of a system.

While various examples circuits or circuitry have been discussed, FIG. 11 depicts a block diagram of an illustrative computer system 1100. The system 1100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1100.

As shown in FIG. 11, the system 1100 includes a so-called chipset 1110. A chipset refers to a group of integrated circuits, or chips, that are designed to work together. Chipsets are usually marketed as a single product (e.g., consider chipsets marketed under the brands Intel®, AMD®, etc.).

In the example of FIG. 11, the chipset 1110 has a particular architecture, which may vary to some extent depending on brand or manufacturer. The architecture of the chipset 1110 includes a core and memory control group 1120 and an I/O controller hub 1150 that exchange information (e.g., data, signals, commands, etc.) via, for example, a direct management interface or direct media interface (DMI) 1142 or a link controller 1144. In the example of FIG. 11, the DMI 1142 is a chip-to-chip interface (sometimes referred to as being a link between a "northbridge" and a "southbridge").

The core and memory control group 1120 include one or more processors 1122 (e.g., single core or multi-core) and a memory controller hub 1126 that exchange information via a front side bus (FSB) 1124. As described herein, various components of the core and memory control group 1120 may be integrated onto a single processor die, for example, to make a chip that supplants the conventional "northbridge" style architecture.

The memory controller hub 1126 interfaces with memory 1140. For example, the memory controller hub 1126 may provide support for DDR SDRAM memory (e.g., DDR, DDR2, DDR3, etc.). In general, the memory 1140 is a type of random-access memory (RAM). It is often referred to as "system memory".

The memory controller hub 1126 further includes a low-voltage differential signaling interface (LVDS) 1132. The LVDS 1132 may be a so-called LVDS Display Interface (LDI) for support of a display device 1192 (e.g., a CRT, a flat panel, a projector, etc.). As an example, a display device may be a touchscreen. A block 1138 includes some examples of technologies that may be supported via the LVDS interface 1132 (e.g., serial digital video, HDMI/DVI, display port). The memory controller hub 1126 also includes one or more PCI-express interfaces (PCI-E) 1134, for example, for support of discrete graphics 1136. Discrete graphics using a PCI-E interface has become an alternative approach to an accelerated graphics port (AGP). For example, the memory controller hub 1126 may include a 16-lane (×16) PCI-E port for an external PCI-E-based graphics card. A system may include AGP or PCI-E for support of graphics.

The I/O hub controller 1150 includes a variety of interfaces. The example of FIG. 11 includes a SATA interface 1151, one or more PCI-E interfaces 1152 (optionally one or more legacy PCI interfaces), one or more USB interfaces 1153, a LAN interface 1154 (more generally a network interface), a general purpose I/O interface (GPIO) 1155, a low-pin count (LPC) interface 1170, a power management interface 1161, a clock generator interface 1162, an audio interface 1163 (e.g., for speakers 1194), a total cost of operation (TCO) interface 1164, a system management bus interface (e.g., a multi-master serial computer bus interface) 1165, and a serial peripheral flash memory/controller interface (SPI Flash) 1166, which, in the example of FIG. 11, includes BIOS 1168 and boot code 1190. With respect to network connections, the I/O hub controller 1150 may include integrated gigabit Ethernet controller lines multiplexed with a PCI-E interface port. Other network features may operate independent of a PCI-E interface.

The interfaces of the I/O hub controller 1150 provide for communication with various devices, networks, etc. For example, the SATA interface 1151 provides for reading, writing or reading and writing information on one or more drives 1180 such as HDDs, SDDs or a combination thereof. The I/O hub controller 1150 may also include an advanced host controller interface (AHCI) to support one or more drives 1180. The PCI-E interface 1152 allows for wireless connections 1182 to devices, networks, etc. The USB interface 1153 provides for input devices 1184 such as keyboards (KB), mice and various other devices (e.g., cameras, phones, storage, media players, etc.).

In the example of FIG. 11, the LPC interface 1170 provides for use of one or more ASICs 1171, a trusted platform module (TPM) 1172, a super I/O 1173, a firmware hub 1174, BIOS support 1175 as well as various types of memory 1176 such as ROM 1177, Flash 1178, and non-volatile RAM (NVRAM) 1179. With respect to the TPM 1172, this module may be in the form of a chip that can be used to authenticate software and hardware devices. For example, a TPM may be capable of performing platform authentication and may be used to verify that a system or component seeking access is the expected system or component.

The system 1100, upon power on, may be configured to execute boot code 1190 for the BIOS 1168, as stored within the SPI Flash 1166, and thereafter processes data under the control of one or more operating systems and application software (e.g., stored in system memory 1140).

As an example, the system 1100 may include circuitry for communication via a cellular network, a satellite network or other network. As an example, the system 1100 may include battery management circuitry, for example, smart battery circuitry suitable for managing one or more lithium-ion batteries.

CONCLUSION

Although various examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
a processor;
a memory device that comprises memory accessible by the processor;
a touchscreen operatively coupled to the processor; and
circuitry to decode fields received via the touchscreen, the fields being modulated according to modulation codes associated with a set of tokens positionable on the touchscreen.

2. The apparatus of claim 1 wherein the touchscreen comprises a capacitive touchscreen.

3. The apparatus of claim 1 wherein the touchscreen comprises an infrared touchscreen.

4. The apparatus of claim 1 wherein the modulation codes comprise orthogonal codes.

5. The apparatus of claim 1 comprising assignment circuitry to assign one or more parameters to a modulation code.

6. The apparatus of claim 5 wherein the assignment circuitry assigns the one or more parameters based at least in part on a position on the touchscreen.

7. The apparatus of claim 1 wherein the touchscreen comprises a grid of capacitive sensor circuits, wherein the fields received via the touchscreen comprise fields sensed by the grid of capacitive sensor circuits and wherein the circuitry determines token positions associated with the set of tokens based at least in part on the fields and decodes the fields to identify tokens within the set of tokens.

8. A token comprising:
a body that comprises a base;
power circuitry carried by the body;
capacitive coupling circuitry that capacitively couples the token to at least one field generated by at least one capacitive sensor circuit of a grid of capacitive sensor circuits of a touchscreen; and
modulation circuitry carried by the body and electronically coupled to the power circuitry that modulates the at least one field according to a modulation code that identifies the token.

9. The token of claim 8 wherein the at least one field comprises an electric field and wherein the modulation circuitry modulates an electric charge to thereby modulate the at least one electric field.

10. The token of claim 8 wherein the power circuitry receives energy and converts the received energy to power.

11. The token of claim 8 wherein the power circuitry comprises a battery.

12. The token of claim 8 wherein the base comprises one or more surfaces for supporting the token on a planar surface.

13. The token of claim 8 comprising an upper portion, the upper portion configured to seat the base for token stacking.

14. The set of tokens of claim 8 comprising at least two different modulation codes.

15. A set of tokens comprising a plurality of the token of claim 8 wherein each of the plurality of tokens comprises a different modulation code.

16. A method comprising:
receiving, via a touchscreen, modulated fields associated with a set of tokens on the touchscreen wherein each of the tokens modulates a respective one of the fields in a time varying manner according to a respective modulation code;
determining positions for the tokens based at least in part on the modulated fields; and differentiating at least one of the tokens from at least another one of the tokens based on their corresponding modulated fields.

17. The method of claim 16 wherein the differentiating comprises identifying at least one of the modulation codes.

18. The method of claim 17 wherein the modulation codes comprise orthogonal codes.

19. The method of claim 16 comprising based in part on the differentiating, associating one or more parameters with the at least one of the tokens.

20. The method of claim 19 comprising instructing an application according to at least one of the one or more parameters.

* * * * *